United States Patent [19]

Muramatsu et al.

[11] Patent Number: 4,853,567
[45] Date of Patent: Aug. 1, 1989

[54] DIRECT DRIVE MOTOR

[75] Inventors: Yasuhiko Muramatsu; Susumu Ohta; Toshiyuku Takagi; Haruo Higuchi; Mitsuhiro Nikaido, all of Tokyo, Japan

[73] Assignee: Yokogawa Electric Corporation, Tokyo, Japan

[21] Appl. No.: 156,780

[22] Filed: Feb. 17, 1988

[30] Foreign Application Priority Data

| Mar. 2, 1987 | [JP] | Japan | 62-47156 |
| Mar. 2, 1987 | [JP] | Japan | 62-47157 |
| Mar. 2, 1987 | [JP] | Japan | 62-47158 |
| Mar. 2, 1987 | [JP] | Japan | 62-47159 |
| Mar. 2, 1987 | [JP] | Japan | 62-47160 |

[51] Int. Cl.$^4$ .............................. H02K 7/00
[52] U.S. Cl. ...................... 310/67 R; 310/51; 310/90; 384/619; 384/620
[58] Field of Search ............ 310/67 A, 68 XA, 67 R, 310/51, 90, 91, 42, 154, 181, 261, 254; 318/9; 384/619-621

[56] References Cited

U.S. PATENT DOCUMENTS

| 2,647,808 | 8/1953 | Spurgeon | 384/477 |
| 3,462,626 | 8/1969 | Kluss | 310/67 R |
| 4,011,479 | 3/1977 | Volkrodt | 310/181 |
| 4,501,454 | 2/1985 | Dennis | 384/621 |
| 4,606,654 | 8/1986 | Yatsu | 384/619 |
| 4,686,400 | 8/1987 | Fujisaki | 310/67 R |

Primary Examiner—R. Skudy
Attorney, Agent, or Firm—Moonray Kojima

[57] ABSTRACT

A direct drive motor for use with factory automation, wherein the motor is arranged to directly obtain rotary forces without using a final reduction gear. The direct drive motor has an inner stator, an outer rotor disposed outside the inner stator with a slight air gap formed therebetween, a cylindrical rotor hub to which the outer rotor hub is internally fixed and a bearing provided in an inner cylindrical portion of the rotor hub for rotatably supporting the rotor hub.

4 Claims, 8 Drawing Sheets

DIRECT DRIVE MOTOR

BACKGROUND OF THE INVENTION

1. Field of Invention

This invention relates to a direct drive motor for use with factory automation (often called "FA"), which is arranged to directly obtain a rotational force without using a final reduction gear; and more particularly, to an outer rotor type direct drive motor defined as a magnetic inductor type synchronizing motor which functions as a servo actuator with high accuracy, by precisely detecting the rotational angle of the rotor.

2. Description of the Prior Art

Factory automation requires a motor which performs highly accurate positioning with large torque and at high velocity. The great majority of FA servo actuators used in the prior art combine a final reduction gear with a DC servo motor.

This type of servo actuator has many problems, such as unevenness in torque due to back-lash and lost motion due to low rigidity.

SUMMARY OF THE INVENTION

It is an object of the invention to provide a direct drive motor which is capable of controlling highly accurate positioning at a high velocity without being adversely influenced by unevenness in torque and by lost motion.

To this end, according to one aspect of the invention, there is provided a small-sized direct drive motor which is capable of obtaining large torque with high efficiency and which is simple in construction, readily assembled and low in production cost.

According to another aspect of the invention, there is provided a direct drive motor which exhibits a stable operation without any resonance when the mechanical natural oscillation frequency is increased and when a load is placed on a rotary shaft.

The direct drive motor of the invention comprises an inner stator, an outer rotor comprising a magnetic substance disposed outside the inner stator with a slight air gap formed therebetween, a cylindrical rotor hub having an inside portion to which the outer rotor is fixed, and a bearing for rotatably supporting the rotor.

DETAILED DESCRIPTION OF THE PREFERRED EMBODIMENTS

Figure 1:
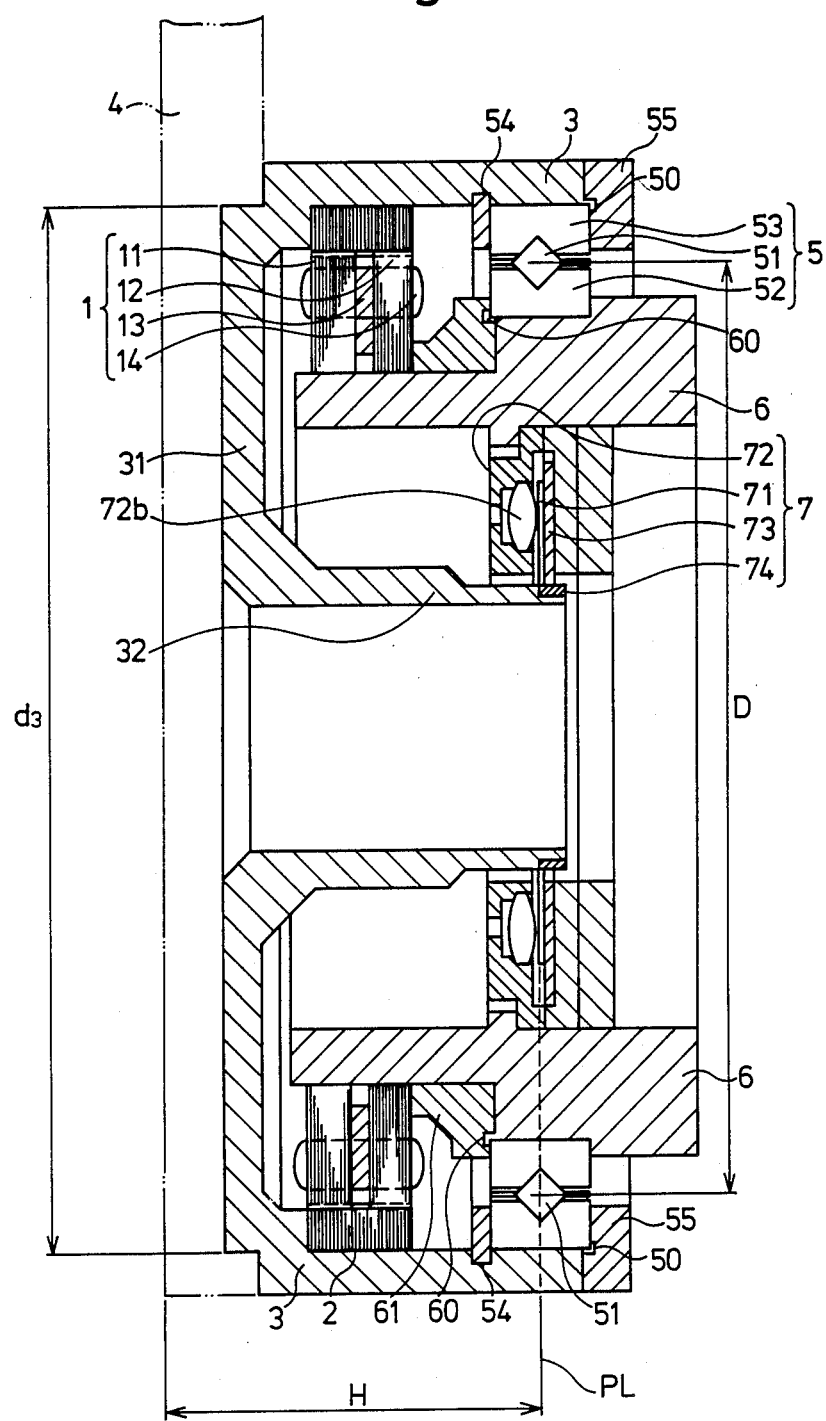
FIG. 1 is a sectional view taken along the rotational axis and depicting an illustrative embodiment of the invention.
Figure 2:
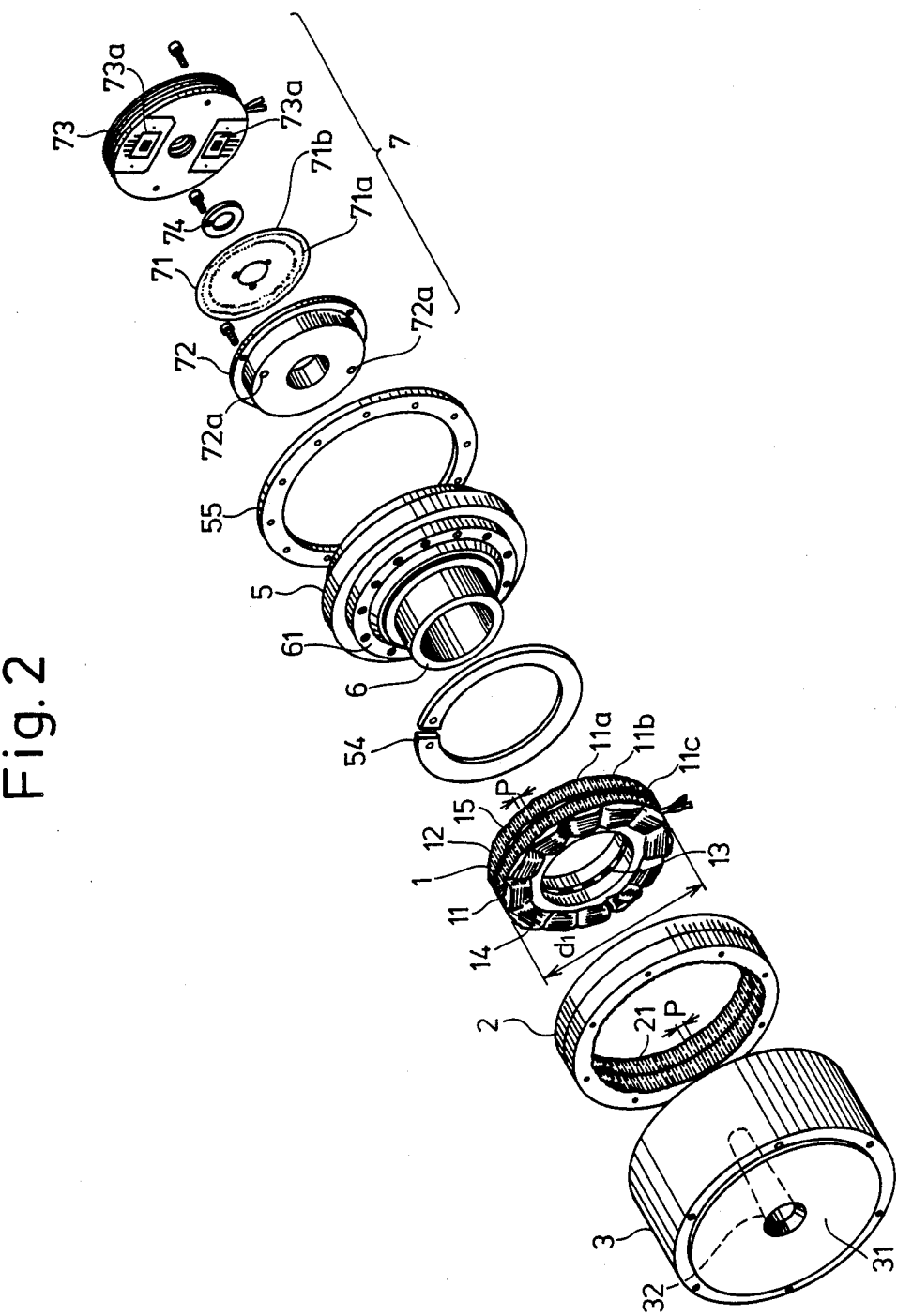
FIG. 2 is an exploded view depicting the embodiment of FIG. 1.

Turning to FIGS. 1 and 2, an inner stator, generally indicated as 1, comprises two pairs of magnetic substances 11 and 12, permanent magnets 13 interposed therebetween and exciting coils 14. The magnetic substances 11 and 12 each includes a plurality of protruded poles 11a, 11b . . . (there being 12 poles in this case, see FIG. 6 for details), each of which is wound with exciting coil 14. Top portions of the protruded poles are formed with teeth 15 provided at a pitch P.

An outer rotor 2 is rotatably disposed outside inner stator 1 with a slight air gap formed therebetween, and its inner surface disposed opposite the outer surface of inner stator 1, is formed with teeth 21 arranged at pitch P.

A rotor hub 3 having a cylindrical configuration is fixedly provided at an outer cylindrical portion of outer rotor 2 and rotates together with outer rotor 2. A load 4 for taking out rotational force for a cylindrical bottom portion 31 is attached to rotor hub 3. A cylindrical fitting portion 32 projects inwards from the bottom portion 31 of rotor hub 3. A tip of this fitting portion 32 is fitted with a slit plate 71 of an encoder 7 which will be described hereinafter.

A bearing, generally designated as 5, serves to support outer rotor 2 through rotor hub 3 on the basis of a cantilever structure. Bearing 5 comprises a rotary roller 51 and holding members 52 and 53 for seizing the rotary roller 51 from the inside and outside. Bearing 5 involves the use of a cross roller bearing.

Figure 3:
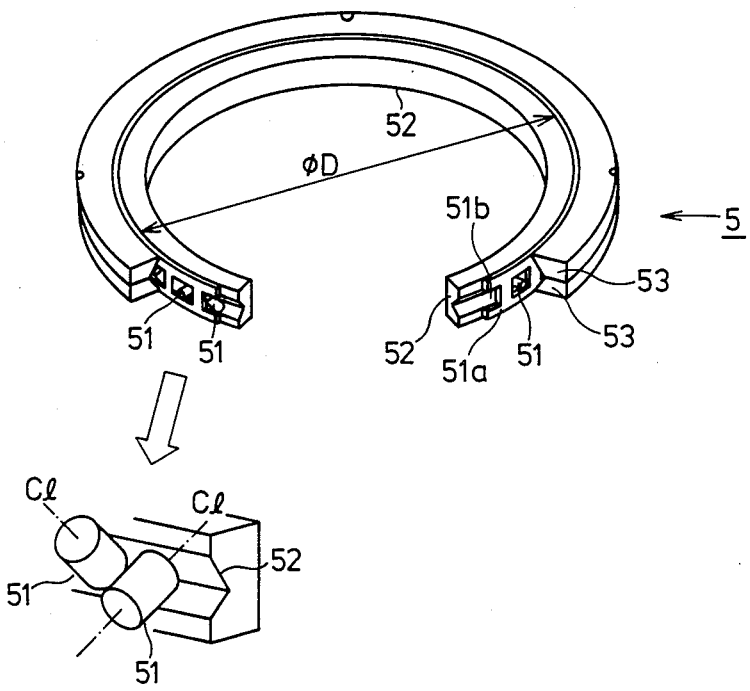
FIG. 3 is an explanatory block diagram depicting a cross bearing used in FIG. 1.

Turning now to FIG. 3, interposed between inside holding member 52 and outside holding member 53 is a retainer 51a perforated at a predetermined pitch with holding holes 51b for holding rotary rollers 51. Rotary rollers 51, fitted in holding holes 51b, perform a rolling function and are arranged on the entire circumference so that rotary axis Cl thereof are alternately orthogonal to each other. Inside holding member 52 and outside holding member 53, respectively, have V-shaped grooves in which individual rotational surfaces of rotary rollers 51 are rotationally brought into contact. Rotary rollers 51 are press-held by these V-shaped grooves both from the inside and from the outside.

The cross roller bearings have almost no elastic deformation caused by bearing load because of the linear contact of the rolling surface of each individual rotary roller 51. In addition, the cross roller bearings are characteristically capable of simultaneously undergoing complicated loads such as a radial load, an axial load and a moment load.

Returning to FIGS. 1 and 2, a C-shaped fixing ring 54 is fixed to an inner cylindrical peripheral portion of rotor hub 3.

Figure 4:
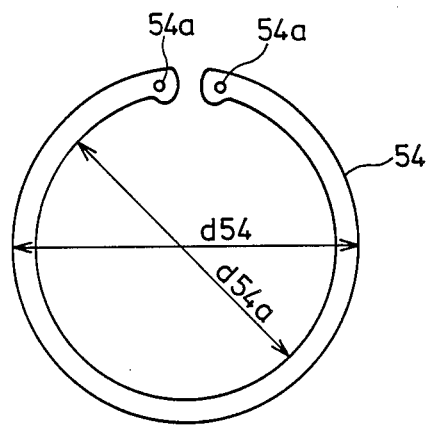
FIG. 4 is a plan view depicting a fixing ring used in the FIG. 1 embodiment.

Turning now to FIG. 4, C-shaped fixing ring 54 has an outer diameter $d_{54}$ which is slightly greater than diameter $d_3$ of the inner cylindrical peripheral portion of rotor hub 3, and an inside diameter $d_{54a}$ which is a bit larger than the outside diameter $d_1$ of inner stator 1. Tension holes 54a are formed in both ends of fixing ring 54. Fixing ring 54 is fixed to the inner cylindrical peripheral portion of rotor hub 3 is the following manner. Both ends of fixing ring 54 are tensioned toward each other by making use of tension holes 54a, with the result that outside diameter $d_{54}$ becomes smaller than inside diameter $d_3$ of rotor hub 3. In this state, fixing ring 54 is inserted into the inner cylindrical portion of the rotor hub 3 and is then fitted in a groove in the inner peripheral portion thereof. Subsequently, the tension is released. As a result, fixing ring 54 reverts to its original state, i.e. the state in which the outside diameter $d_{54}$ is restored, whereby fixing ring 54 is fixed in a predetermined position within rotor hub 3.

A clamp ring, generally designated as 55, clamps down one holding member 53 of bearing 5 in such a state that holding member 53 is sandwiched in between fixing ring 54 and clamp ring 55, thus fixing holding member 53 to rotor hub 3. Fixing ring 54 performs a significant function in terms of fixing bearing 5 in an exact position within the inner cylindrical portion of rotor hub 3. Furthermore, ring 54 helps the thickness of the outer periphery of rotor hub 3 to be made uniform in the axial direction and is also helpful in increasing the rigidity without making the outside diameter large.

A cylindrical housing 6 is placed to permit rotor hub 3 to accommodate a number of components. Fixed to housing 6 are inner stator 1 and holding member 52 of bearing 5. A clamp ring 61 is used for fixing holding member 52 to housing 6.

An encoder 7 serves to detect rotational displacement of rotor hub 3 and involves use of an optical encoder. Encoder 7 comprises a rotary slit plate 71 fixed to a central cylindrical fitting portion 32 of rotor hub 3; a light irradiation unit 72 including a lens and an LED by which rotary slit plate 71 is irradiated with beams of light; a light receiving element for receiving the light passing through slit plate 71; and an assembly 73 incorporating a signal processing unit for obtaining a signal corresponding to the rotational angle of motor hub 3 by processing a signal transmitted from the light receiving element. A fitting ring 74 is used for fixing slit plate 71 to central cylindrical fitting portion 32.

Fitting portion 32 of rotor hub 3 is provided in cylindrical housing 6. Slit plate 71 is attached to the tip of fitting portion 32 so that plate 71 is substantially flush with a plane PL on which bearing 5 is disposed. Note that encoder 7 may be omitted if no signal associated with the rotational displacement of rotor hub 3 is required.

In the illustrative motor, it is desirable to select the relation, such as, $D>H$, wherein D is the diameter of bearing 5 and H is the maximum axial length of the load system comprising load 4 and rotor hub 3 rotatably supported on bearing 5 on the basis of a cantilevered structure.

Rotor hub 3 and cylindrical housing 6 are preferably formed of light alloys. Clamp rings 55 and 61 for fixing bearing 5 to rotor hub 3 and to housing 6 are likewise preferably formed of light alloys. In this case, the device as a whole can be reduced in weight. If the ambient temperature varies, pressing forces exerted by clamps rights 55 and 61 on the bearing 5 are almost equalized with respect to housing 6 and rotor hub 3, thereby causing substantially no deformation of the bearing.

Figure 5:
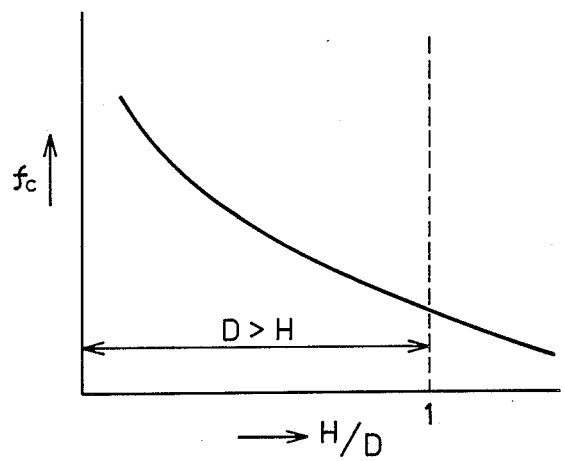
FIG. 5 is a diagram depicting the relation between the ratio H/D, of maximum axial length H of the load system, to diameter D of the bearing, and the natural oscillation frequency fc of the motor as a whole.

As can be seen in FIG. 5, the natural frequency fc of the entire motor varies somewhat according to the relation between the diameter D of bearing 5 and the maximum axial length of the load system H. The natural frequency fc of the entire motor can be augmented by selecting the relation given by $D>H$, resulting in elimination of influence of oscillation caused by the resonance.

Next, fabrication of the direct drive motor will be discussed in connection with FIG. 2. To start with, outer rotor 2 is inserted in the inner cylindrical portion of rotor hub 3, and the two components are fixed to each other by, for example, a bonding agent or a screw or a combination thereof, to form a single unified body. Inside diameter $d_3$ of rotor hub 3 is substantially equal to or slightly greater than the outside diameter of the magnetic substance of outer rotor 2 and the outside diameter of bearing 5, thereby fixing outer rotor 2 exactly to the inner cylindrical portion.

Subsequently, the C-shaped fixing ring 54 is fixed to the inner peripheral portion of rotor hub 3 in accordance with the above procedure. Inner stator 1 is inserted in the cylindrical portion of housing 6 and they are fixed by, e.g. bonding agent or the like, to form a single unified body. Light irradiation unit 72 is fastened to the inner cylindrical portion of housing 6 with, e.g. a screw.

Secondly, housing 6 is inserted in the cylindrical portion of rotor hub 3. Bearing 5 is disposed between the inside of rotor hub 3 and the outside of housing 6, and outside holding member 53 of bearing 5 is press-fastened to fixing ring 54 of rotor hub 3 by using clamp ring 55. Similarly, inside holding member 52 of bearing 5 is press-fastened to housing 6 with clamp ring 61. This arrangement permits bearing 5 to be supported on fixing ring 54 and clamp rings 55 and 61 in the exact position between rotor hub 3 and housing 6. In the individual clamp rings 55 and 61, notches 50 and 60 are formed respectively in press fitting parts with respect to holding members 52 and 53, whereby the pressing forces acting on bearing 5 are suitably absorbed to support the bearing by the resultant proper pressing forces.

Slit plate 71 of encoder 7 is fixed to the tip of central cylindrical fitting portion 32 of rotor hub 3 with a fitting ring 74. Signal processing unit assembly 73 is fitted to the inside of housing 6 while positioning assembly 73 so that slits 71a and 71b formed in slit plate 71 admit beams of light emitted from light irradiation unit 72, and the beams of light accurately fall upon an image sensor 73a. The assembly is thus completed.

In the illustrative direct drive motor, the portion for generating the driving torque is provided on the outer peripheral portion. Hence, a large amount of torque can be obtained with a miniaturized structure as a whole. The fixation and positioning of the bearing for supporting the rotor hub are effected by making use of the C-shaped fixing ring 54, whereby inside diameter $d_3$ of rotor hub 3 can be made constant in the axial direction. Moreover, it is feasible to facilitate the positioning and the fixation of the bearing and outer rotor 2 with respect to rotor hub 3 and further to increase the rigidity with no increment in outside diameter.

Figure 6:
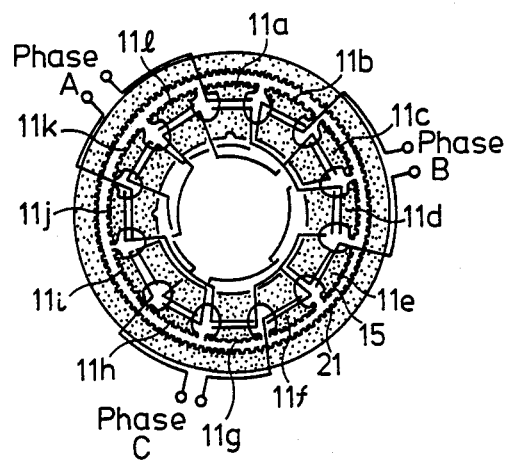
FIG. 6 is a view depicting the manner of winding of an exciting coil provided in an inner stator.

FIG. 6 illustrates a way to wind exciting coils 14 (FIG. 7) provided in stator 1. There is used a 3-phase exciting circuit having phase A, phase B and phase C. Phase A is arranged such that coils 14 are wound in series on every third pole, i.e. totaling four poles 11a, 11d, 11g and 11j. For clarity of understanding of the series circuit connections of the windings, one can trace the lines shown in FIG. 6 as follows: From 11a, then inside 11b, then inside 11c, to 11d; then from 11d, to inside 11e, inside 11f, to 11g; then from 11g, inside 11h, inside 11i, to 11j. In phase B, coils 14 are wound in series on protruded poles 11b, 11e, 11h and 11k. In phase C, coils 14 are wound in series on protruded poles 11c, 11f, 11i and 11l. A positional relation between inner stator 1 (FIG. 7) and teeth 15 and 21 formed on the surface opposite to outer rotor 2 (FIG. 7) is the same as that in a PM type 3-phase pulse motor, and hence detailed description thereof is omitted hereat.

Figure 7:
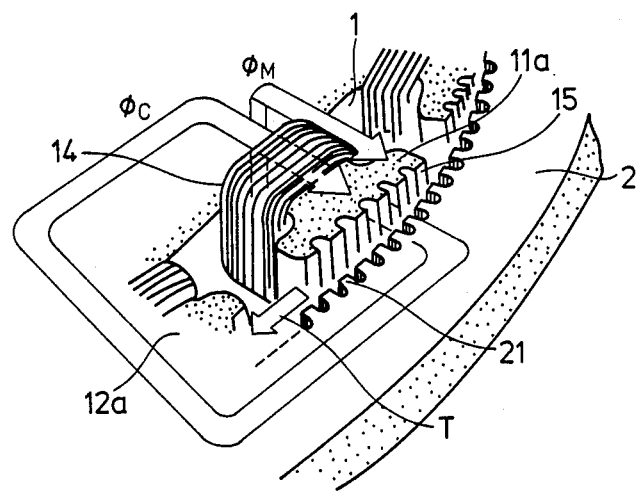
FIG. 7 is a view depicting the principle of rotation of the outer rotor.

FIG. 7 illustrates the principle of rotation of outer rotor 2. In inner stator 1, a magnetic flux at the protruded pole 11a is constituted by a sum of magnetic fluxes which is given by the formula:

$$\Phi_0 = \Phi_M + \Phi_C$$

wherein $\Phi_M$ is the bias magnetic flux produced by a permanent magnet 13 and $\Phi_C$ is the exciting magnetic flux produced by making an exciting electric current flow through exciting coil 14 wound on protruded pole 11a. In connection with the excitation of protruded pole 11a, electric currents flowing through exciting coils 14 are arranged to have a phase difference of 120° with respect to each other in the phase order of, e.g. A,B and C, and the exciting magnetic flux $\Phi_C$ is thereby shifted sequentially from phase A, phase B and phase C. A sum magnetic flux portion expressed by $\Phi_M + \Phi_C$ moves accordingly, so that outer rotor 2 is attracted by this and then rotates.

If a phasic advancement or delay of the exciting electric current flowing in phases A, B and C is changed over, the rotational direction is reversed.

A thrust or torque T of outer rotor 2 is proportional to a square of the sum $\Phi_O$ of the bias magnetic flux $\Phi_M$ and the exciting magnetic flux $\Phi_C$. The torque T is expressed as $$T \propto (\Phi_M + \Phi_C)^2 \cdots \quad (1)$$

In the illustrative motor, a portion, in which torque T given by formula (1) is generated, is positioned on the outer periphery, thereby permitting the generation of a large torque even though the motor is of substantially small size.

In the described embodiment, the inner stator comprises 12 protruded poles and 3-phase exciting circuit. However, the invention is not limited to such an arrangement. Moreover, the permanent magnet which is attached to the inner stator to provide the bias magnetic flux, may also be fitted to the outer rotor.

Figure 8:
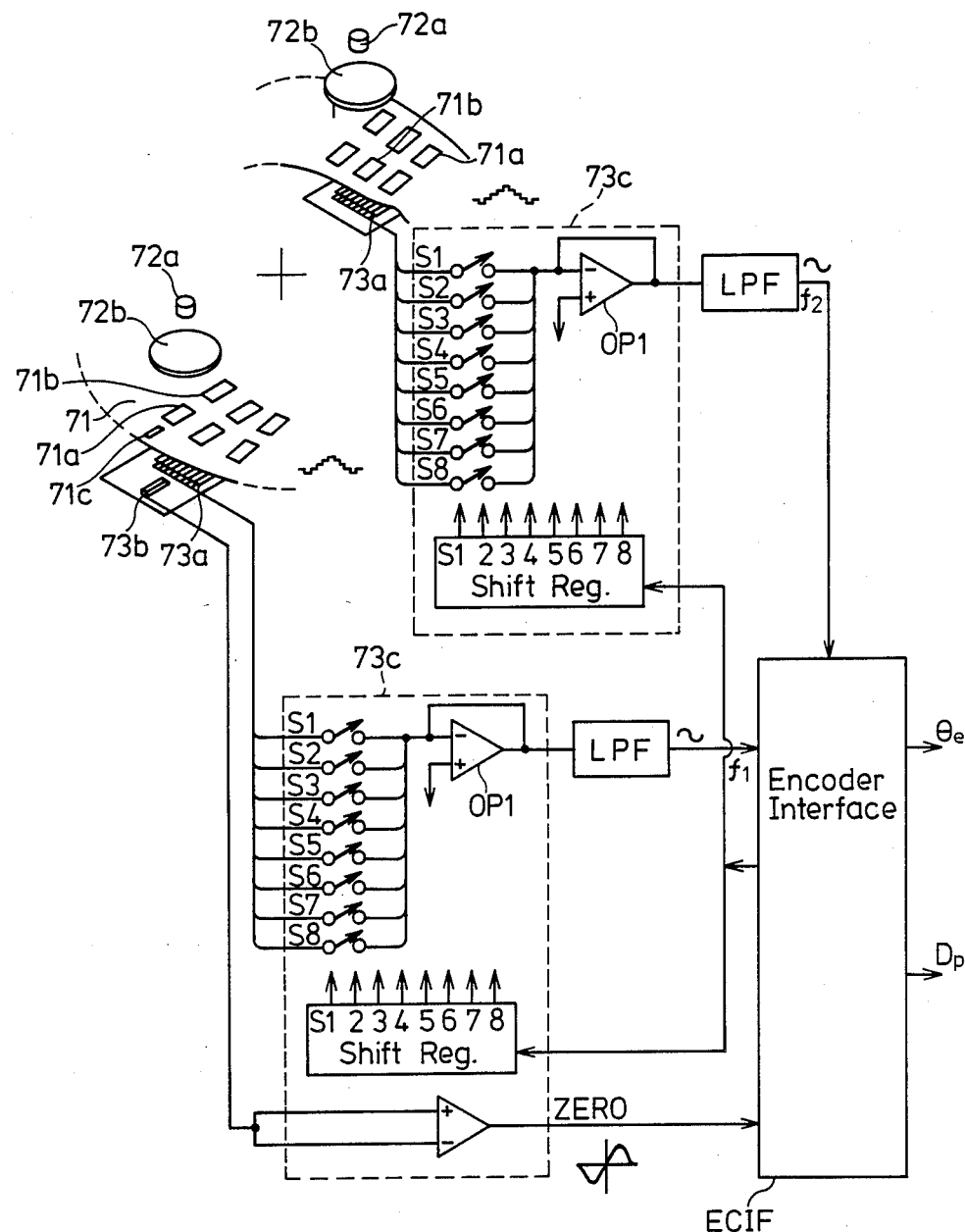
FIG. 8 is a block diagram depicting the principal portions of an encoder for detecting the rotational angle of the outer rotor.

Turning to FIG. 8, formed in slit plate 71, which rotates together with the outer rotor 2, are slit trains 71a and 71b arranged in two rows in the peripheral direction. The symbol nl indicates the number of slits of outer slit train 71a while $n_2$ indicates the slit number of the inner slit train 71b. The difference in slit numbers, which is given by $n_1 - n_2$, coincides with the number of teeth 21 provided on the inner surface of the outer rotor 2. Light source 72a may be an LED. A lens 72b is used for changing light emitted from the LED into parallel beams of light. Two sets of light sources 72a and lens 72b are provided for the outer and inner slit trains 71a and 71b so that they are held by the light irradiation unit 72 (see FIG. 2). An image sensor 73b in which for example, 8 photodiodes are arranged in an array, serves to receive light transmitted through the slits. A photodiode 73b is used for detecting a zero point. Photodiode 73b receives light penetrating a zero point slit 71c formed in slit plate 71. A signal processing circuit 73C is provided for processing a signal coming from photodiode 73b. Signal processing circuit 73c comprises switches S1 through S8 for sequentially obtaining from the eight photodiodes 73a signals which are transmitted at a given timing, an amplifier OP1 for amplifying the signals through the respective switches, a low pass filter for extracting sine wave signal components from output signals from amplifier OP1, and an encoder interface ECIF comprising a microprocessor for obtaining a signal $\theta_e$ associated with the positional deviation of the teeth of stator 1 and rotor 2 by use of two signals $f_1$ and $f_2$ that have periodic functions waveforms obtained from the low pass filter LPF by outputting signals $f_1$ and $f_2$ and performing a predetermined signal processing by using, e.g., one signal $f_1$ to obtain a rotational position signal Dp for slit plate 71.

The method of acquiring the rotational position signal Dp from the periodic function $f_1$ or another periodic function $f_2$ is identical to the way of obtaining the position signal by processing the signal transmitted from a space filter. On the other hand, the method of getting the positional deviation signal $\theta_e$ of the teeth is the same as the way of obtaining the phasic difference between the two signals $f_1$ and $f_2$. These methods are widely known.

Figure 9:
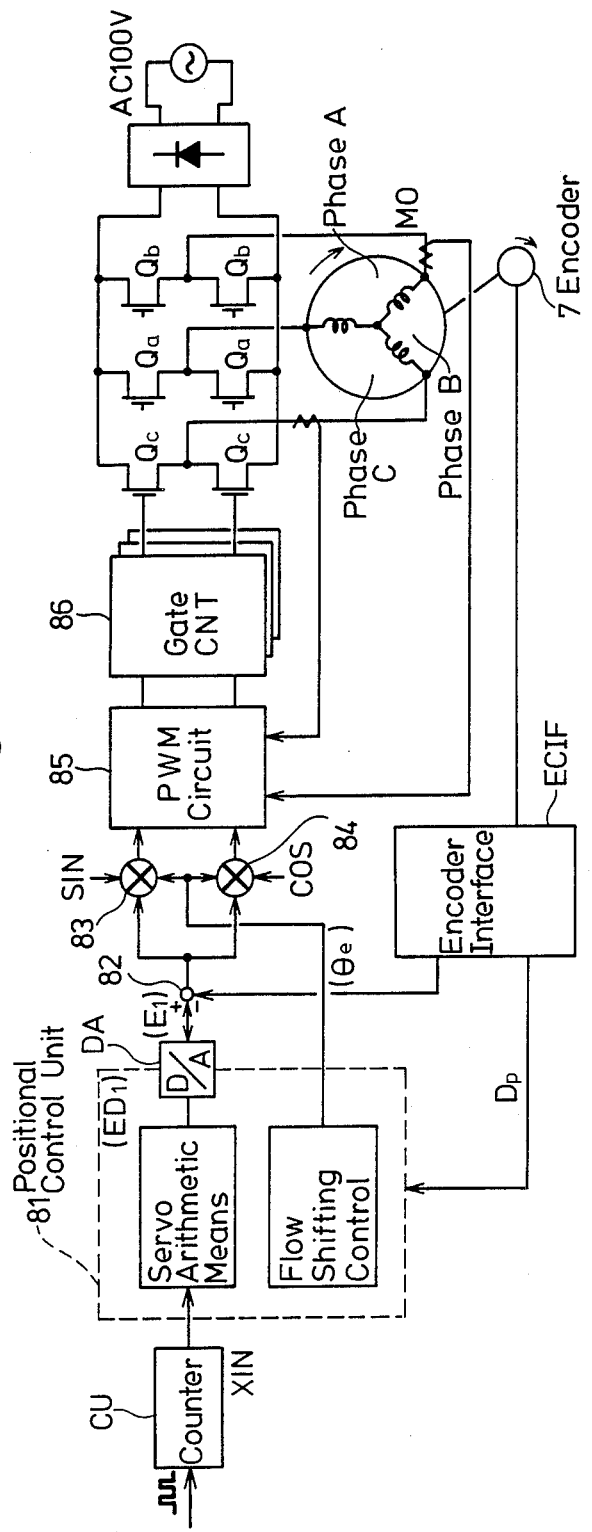
FIG. 9 is a block diagram depicting operation of the invention motor as a servo actuator.

In FIG. 9, a position control unit 81 comprises a microprocessor. Position control unit 81 inputs both a signal transmitted from a counter for counting serial pulses defined as position command signals and a position signal Dp sent from encoder interface ECIF. Control unit 81 also performs, e.g., PID arithmetic on the basis of position signal Dp outputted from encoder interface ECIF and position command signal X, thereby obtaining a velocity command value output $ED_1$ of outer rotor 2. Subsequently, velocity command value output $ED_1$ is outputted as an analog signal $E_1$ by means of a D/A converter DA. An add circuit 82 is used for obtaining the difference between the analog signal from the D/A converter DA and a velocity feedback signal $\theta_e$ from encoder interface ECIF and for imparting this difference through communicating means 83 and 84 to a pulse width converting circuit, also called PWM circuit 85. A gate circuit 86 receives a signal transmitted from PWM circuit 85 and controls exciting electric currents flowing through an A-phase winding, a B-phase winding and a C-phase winding of motor unit MO by using switching elements Qa to Qc. Electric currents flowing through the B-phase winding and the C-phase winding are fed back to PWM circuit 85.

The illustrative servo actuator constitutes a tertiary servo system for feedback based on position signal Dp, feedback based on velocity signal $\theta_e$ and current feedback based on the signal corresponding to the exciting electric current. Hence, a high speed and highly accurate servo actuator is readily obtained by the invention without any adverse influence of disturbance caused by fluctuations in load.

In the described embodiment, rotor hub 3 is supported by making use of a cross roller bearing. However, bearings having other structures may also be used. Also, the encoder which is disclosed herein involves the use of an optical encoder having a slit plate attached to a rotor hub. However, other types of structures may also be used, even though the structures described are preferred. The inner stator incorporates 21 protruded poles; and a 3-phase exciting circuit is used in the embodiment. The motor unit, however, is not limited to such structures. The permanent magnet for imparting bias magnetic flux is fitted to the inner stator in the disclosed embodiment, but, may also be attached to the outer rotor.

Advantageously, according to the invention, torque is obtained directly from rotor hub 3. Also, a large torque is obtained without creating unevenness in torque or being subjected to any adverse influences caused by lost motion, even though the apparatus is relatively small on the whole.

Figure 10:
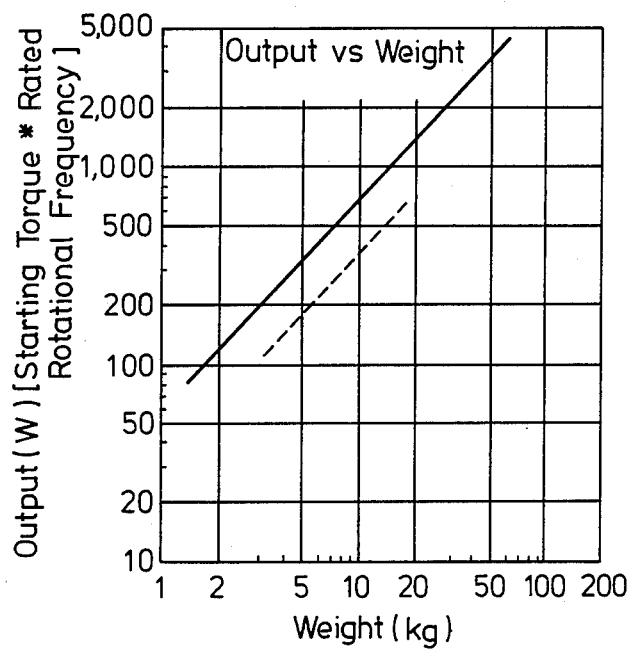
FIG. 10 is a diagram depicting the relation between weight and the output of the motor.

FIG. 10 is a diagram depicting the relation between weight and output (starting torque x rated frequency of rotation) of the illustrative motor. The broken line indicates the characteristics of a prior art DC motor having a final reduction gear. The results given in FIG. 10 prove that performance of the invention is superior to a conventional motor which is used combined with a final reduction gear.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A direct drive motor comprising
an inner stator having two pairs of magnetic substances, permanent magnets interposed therebetween and exciting coils;
a cylindrical housing to which said inner stator is fixed;
an outer rotor disposed outside said inner stator with a slight air gap formed therebetween;
a cylindrical rotor hub having its inside portion to which said outer rotor is fixed; and
a cross roller bearing, provided in an inner cylindrical portion of said rotor hub, for rotatably supporting said rotor hub,
said rotor hub being rotatably supported on said cross roller bearing within said inner cylindrical portion of said rotor hub on the basis of cantilever structure; said inner stator is fixed to said cylindrical housing, said bearing is fastened with a clamp ring between said rotor hub and said housing, wherein said clamp ring includes notches for absorbing forces acting on said clamp ring.

2. The motor of claim 1, wherein said being has a diameter D and a load system, including said rotor hub with a maximum axial length H such that $D>H$.

3. The motor of claim 1, wherein said rotor hub, said cylindrical housing and said clamp ring are formed of light alloys.

4. The motor of claim 1, further comprising a C-shaped fixing ring fixed to said inner cylindrical portion of said rotor hub.

* * * * *